US011126307B2

United States Patent
Meng et al.

(10) Patent No.: US 11,126,307 B2
(45) Date of Patent: Sep. 21, 2021

(54) DETECTION DEVICE AND DETECTION METHOD FOR TOUCH PANEL

(71) Applicants: Beijing BOE Optoelectronics Technology Co., Ltd., Beijing (CN); BOE Technology Group Co., Ltd., Beijing (CN)

(72) Inventors: Chen Meng, Beijing (CN); Wei Sun, Beijing (CN); Wenchao Han, Beijing (CN); Yushuang Zhou, Beijing (CN); Wei Wang, Beijing (CN); Tiankuo Shi, Beijing (CN); Yang Chen, Beijing (CN); Tian Zhang, Beijing (CN); Bo Gao, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 49 days.

(21) Appl. No.: 16/108,145

(22) Filed: Aug. 22, 2018

(65) Prior Publication Data
US 2019/0235659 A1    Aug. 1, 2019

(30) Foreign Application Priority Data
Jan. 29, 2018  (CN) .......................... 201810082450.8

(51) Int. Cl.
*G06F 3/044* (2006.01)
*G06F 3/047* (2006.01)
(Continued)

(52) U.S. Cl.
CPC .............. *G06F 3/044* (2013.01); *G06F 3/047* (2013.01); *G06F 3/0418* (2013.01);
(Continued)

(58) Field of Classification Search
CPC ................... G06F 3/044; G06F 3/047; G06F 2203/04112; G06F 3/0418; G06F 11/2221; G06F 3/0443; G01R 31/026
See application file for complete search history.

(56) References Cited

U.S. PATENT DOCUMENTS

2010/0289769 A1    11/2010  Watanabe
2011/0175823 A1*   7/2011   Vieta ..................... G06F 3/0412
                                                                345/173
(Continued)

FOREIGN PATENT DOCUMENTS

CN     103324366 A     9/2013
CN     103969538 A     8/2014
(Continued)

OTHER PUBLICATIONS

First office action of Chinese application No. 201810082450.8 dated Oct. 18, 2019.

*Primary Examiner* — Carolyn R Edwards
(74) *Attorney, Agent, or Firm* — Fay Sharpe LLP

(57) ABSTRACT

A detection device and method for touch panel are provided. The device includes a wiring module configured to ground lead of at least one of first touch electrodes; and a processing module configured to detect capacitance value of at least one of second touch electrodes one by one, and determine whether the second touch electrode is broken circuit according to the capacitance value of each of the second touch electrodes which is adjacent to at least one of the first touch electrodes. During detection, the at least one first touch electrode is grounded, and the second touch electrode and the first touch electrode with a lead grounded form a capacitor. If the second touch electrode is not broken circuit, the capacitance value detected is greater than the capacitance value when the first touch electrode is not grounded.

(Continued)

It is beneficial for detecting accurately whether the touch electrode is broken circuit.

16 Claims, 8 Drawing Sheets

(51) Int. Cl.
    *G06F 11/22*         (2006.01)
    *G06F 3/041*        (2006.01)

(52) U.S. Cl.
    CPC ........ *G06F 3/0443* (2019.05); *G06F 11/2221* (2013.01); *G06F 2203/04112* (2013.01)

(56) References Cited

U.S. PATENT DOCUMENTS

| | | | |
|---|---|---|---|
| 2012/0293455 A1* | 11/2012 | Shen | G06F 3/0418 345/174 |
| 2014/0203816 A1 | 7/2014 | Li et al. | |
| 2014/0361786 A1* | 12/2014 | Yao | G09G 3/006 324/537 |
| 2016/0188090 A1 | 6/2016 | Lu et al. | |
| 2016/0357333 A1* | 12/2016 | Huang | G06F 3/0446 |
| 2016/0364068 A1* | 12/2016 | Cheng | G09G 3/006 |
| 2017/0205956 A1* | 7/2017 | Li | G02F 1/13338 |
| 2018/0173335 A1* | 6/2018 | Gong | G06F 3/0418 |
| 2018/0314371 A1* | 11/2018 | Jin | G06F 3/047 |
| 2019/0005861 A1* | 1/2019 | Huang | G06F 3/0416 |
| 2019/0034054 A1* | 1/2019 | Zhang | G06F 1/3228 |
| 2019/0095034 A1* | 3/2019 | Xu | G06F 3/04166 |
| 2019/0121474 A1* | 4/2019 | Lee | G06F 3/0443 |
| 2019/0138150 A1* | 5/2019 | Kim | G06F 3/0418 |
| 2019/0171319 A1* | 6/2019 | Aoki | G06F 3/0412 |

FOREIGN PATENT DOCUMENTS

| | | |
|---|---|---|
| CN | 104484071 A | 4/2015 |
| CN | 105975129 A | 9/2016 |

\* cited by examiner

DETECTION DEVICE AND DETECTION METHOD FOR TOUCH PANEL

This application claims priority to Chinese Patent Application No. 201810082450.8, filed with the State Intellectual Property Office on Jan. 29, 2018 and titled "DETECTION DEVICE AND DETECTION METHOD FOR TOUCH PANEL", the entire contents of which are incorporated herein by reference

TECHNICAL FIELD

The present disclosure relates to a detection device and method for a touch panel.

BACKGROUND

A self-capacitive touch panel as a common touch panel generally comprises a plurality of touch electrodes arranged in a matrix. Each touch electrode is connected to a control chip through a single lead respectively. The control chip detects each touch electrode through the lead, and determines a position where a touch occurs according to the change in the capacitance of each touch electrode.

If the lead of a touch electrode is broken, the touch panel cannot detect the touch from a finger when the area where the touch electrode located is touched with the finger, thereby affecting the normal use of the touch panel. Therefore, it is necessary to detect the touch panel to determine whether the lead of each touch electrode on the touch panel is broken.

SUMMARY

At least one embodiment of the present disclosure provides a detection device and method for a touch panel.

At least one embodiment of the present disclosure provides a detection device for a touch panel, wherein the touch panel comprises: a plurality of touch electrodes arranged in a matrix, and the detection device comprise:

a wiring module configured to ground a lead of at least one of first touch electrodes of the plurality of touch electrodes; and a processing module configured to detect a capacitance value of at least one of second touch electrodes of the plurality of touch electrodes one by one, and determine whether the corresponding second touch electrode is broken circuit according to the capacitance value of each of the second touch electrodes, each of the second touch electrodes being adjacent to at least one of the first touch electrodes.

Optionally, any two of the second touch electrodes are spaced by at least one of the first touch electrodes.

Optionally, each touch electrode adjacent to the second touch electrode is the first touch electrode.

Optionally, a portion of the touch electrodes adjacent to the second touch electrode are the first touch electrodes.

Optionally, the processing module is configured to detect capacitance values of a set of second touch electrodes in a target direction one by one, the target direction is one of a row direction and a column direction, and the set of second touch electrodes in the target direction is adjacent to at least one set of first touch electrodes in the target direction.

Optionally, the processing module is configured to determine that the second touch electrode is broken circuit when a capacitance change value of the second touch electrode before and after the lead of the first touch electrode is grounded is less than a first set value.

Optionally, the processing module is configured to determine that the second touch electrode is broken circuit when a capacitance value of the second touch electrode after the lead of the first touch electrode is grounded is less than a second set value.

Optionally, the processing module is configured to send a pulse signal to the second touch electrode through a lead connected to the second touch electrode, and determine the capacitance value of the second touch electrode according to a voltage signal generated by the second touch electrode.

Optionally, the wiring module comprises a ground line and a plurality of first switches, and the lead of each of the touch electrodes is connected to the ground line through one of the plurality of first switches.

Optionally, the processing module comprises a plurality of second switches, a plurality of analog front ends (Analog Front Ends, AFE), and a processor, the lead of each of the touch electrodes is connected to one of the analog front ends through one of the second switches, and each of the analog front ends is connected to the processor.

At least one embodiment of the present disclosure provides a detection method for a touch panel, wherein the touch panel comprises a plurality of touch electrodes arranged in a matrix, and the detection method comprises:

grounding a lead of at least one of first touch electrodes of the plurality of touch electrodes;

detecting a capacitance value of at least one of second touch electrodes of the plurality of touch electrodes one by one; and determining whether the corresponding second touch electrode is broken circuit according to the capacitance value of each of the second touch electrodes, each of the second touch electrodes being adjacent to at least one of the first touch electrodes.

Optionally, any two of the second touch electrodes are spaced by at least one of the first touch electrode.

Optionally, each touch electrode adjacent to the second touch electrode is the first touch electrode.

Optionally, a portion of the touch electrodes adjacent to the second touch electrode are the first touch electrodes.

Optionally, grounding a lead of at least one of first touch electrodes of the plurality of touch electrodes comprises:

grounding at least one set of the first touch electrode in a target direction; and correspondingly, detecting a capacitance value of at least one of second touch electrodes of the plurality of touch electrodes one by one comprises:

detecting capacitance values of a set of second touch electrodes in a target direction one by one;

the target direction is one of a row direction and a column direction, and the set of second touch electrodes in the target direction is adjacent to at least one set of first touch electrodes in the target direction.

Optionally, determining whether the corresponding second touch electrode is broken circuit according to the capacitance value of each of the second touch electrodes comprises:

determining that the second touch electrode is broken circuit when a capacitance change value of the second touch electrode before and after the lead of the first touch electrode is grounded is less than a first set value.

Optionally, wherein determining whether the corresponding second touch electrode is broken circuit according to the capacitance value of each of the second touch electrodes comprises:

determining that the second touch electrode is broken circuit when a capacitance value of the second touch electrode after the lead of the first touch electrode is grounded is less than a second set value.

Optionally, detecting a capacitance value of at least one of second touch electrodes of the plurality of touch electrodes one by one comprises:

sending a pulse signal to the second touch electrode through a lead connected to the second touch electrode, and determining the capacitance value of the second touch electrode according to a voltage signal generated by the second touch electrode.

DETAILED DESCRIPTION

The present disclosure will be described in further detail with reference to the enclosed drawings, to clearly present the principles and advantages of the present disclosure.

For a better understanding of the present disclosure, the structure of a self-capacitive touch panel will be briefly described below.

Figure 1:
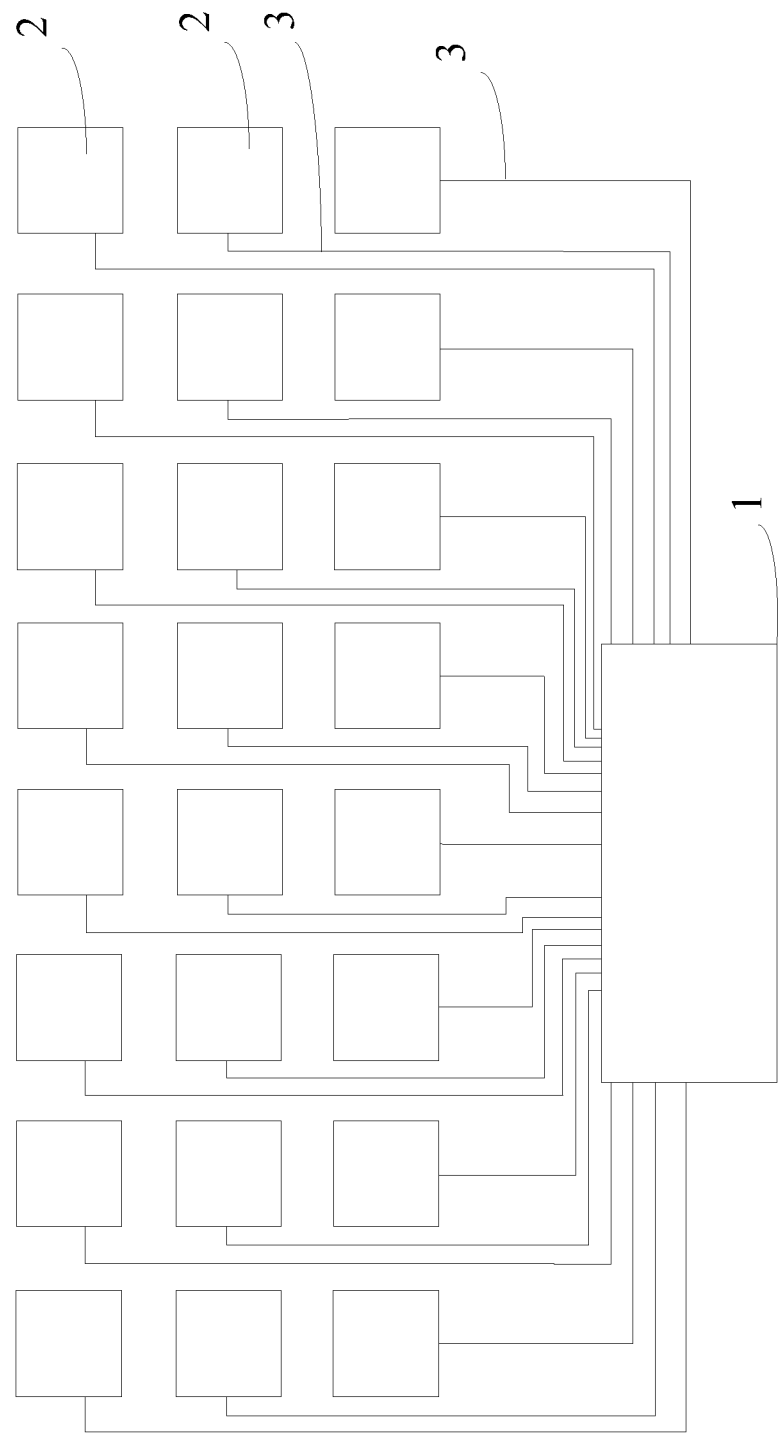
FIG. 1 is a schematic diagram of a partial structure of a self-capacitive touch panel.

FIG. 1 is a schematic diagram of a partial structure of a self-capacitive touch panel. As shown in FIG. 1, the self-capacitive touch panel comprises a base substrate (not shown) and a plurality of touch electrodes 2 arranged on the base substrate in a matrix. Each touch electrode 2 is provided with a lead 3 correspondingly. Each touch electrode 2 is connected to a touch detection chip 1 through the corresponding lead 3. Each touch electrode 2 and the ground form a capacitor. When the touch electrode 2 is touched with a finger, the capacitance of the touched touch electrode 2 increases. The touch detection chip 1 detects the capacitances of the respective touch electrodes 2 one by one, and determines the touched touch electrode 2 according to the change in the capacitances of the touch electrodes 2, thereby determining a touched position.

At present, while detecting whether the lead of the touch electrode on the touch panel is broken, it is usually to charge the touch electrode when the touch electrode is not touched, and detect the capacitance change value of this touch electrode within a period of time during the charging process. If the capacitance change value is relatively large, it is considered that the lead connected to this touch electrode is intact. If the capacitance change value is relatively small, it is considered that the lead connected to this touch electrode is broken. However, within this period of time, the difference of the capacitance change value of the touch electrode with the intact lead and the capacitance change value of the touch electrode with the broken lead is slight. Therefore, this detection method is prone to misjudgment and omission of judgement, which affects the yield of the product.

Figure 2:
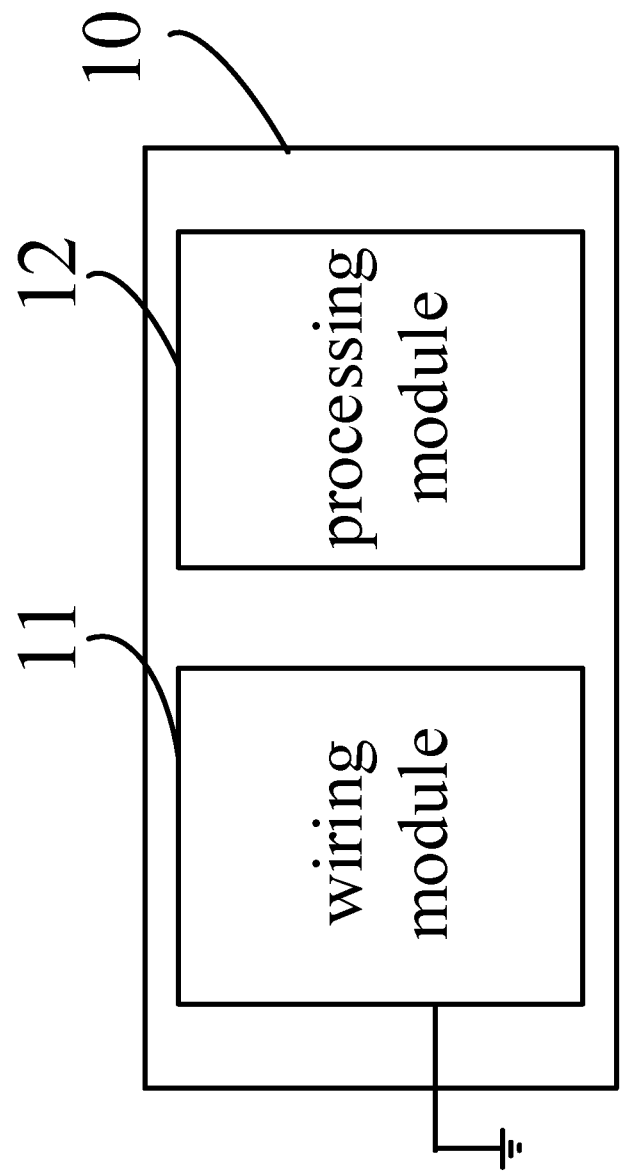
FIG. 2 is a schematic diagram of a structure of a detection device of a touch panel according to an embodiment of the present disclosure.

FIG. 2 is a schematic diagram of a structure of a detection device for a touch panel provided by an embodiment of the present disclosure. As shown in FIG. 2, the detection device 10 comprises a wiring module 11 and a processing module 12. The wiring module 11 is configured to ground a lead of at least one of first touch electrodes of the plurality of touch electrodes. The processing module 12 is configured to detect a capacitance value of at least one of second touch electrodes of the plurality of touch electrodes one by one, and determine whether the corresponding second touch electrode is broken circuit according to the capacitance value of each of the second touch electrodes, wherein each of the second touch electrodes being adjacent to at least one of first touch electrodes.

Figure 3:
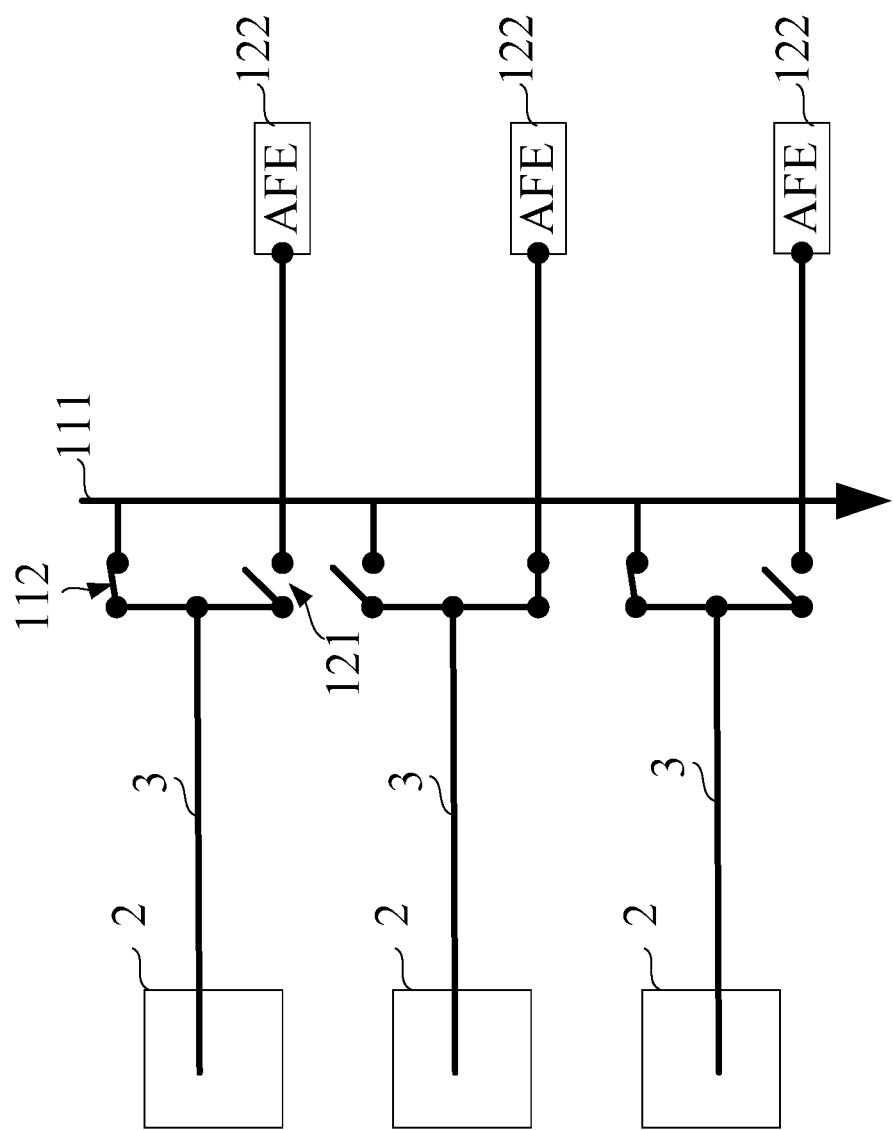
FIG. 3 is a schematic diagram of a structure of a partial circuit of a detection device according to an embodiment of the present disclosure.

FIG. 3 is a schematic diagram of a structure of a partial circuit of a detection device provided by an embodiment of the present disclosure. Exemplarily, as shown in FIG. 3, the wiring module comprises a ground line 111 and a plurality of first switches 112. A lead 3 of each touch electrode 2 is connected to the ground line 111 through one first switch 112. The processing module comprises a plurality of second switches 121 and a plurality of Analog Front Ends (AFE) 122. The lead 3 of each touch electrode 2 is connected to the corresponding AFE 122 through one second switch 121. Each AFE 122 is configured to detect a capacitance of the connected touch electrode 2.

When the touch electrode 2 is the first touch electrode, e.g., the touch electrode 2 respectively located on the upper and lower sides in FIG. 3, the second switch 121 corresponding to the touch electrode 2 is open, and the first switch 112 corresponding to the touch electrode 2 is closed, such that the touch electrode 2 is grounded through the connected first switch 112. When the touch electrode 2 is the second touch electrode, e.g., the touch electrode 2 located in the middle of FIG. 3, the first switch 112 corresponding to the touch electrode 2 is open, and the second switch 121 corresponding to the touch electrode 2 is closed, such that the AFE 122 detects the capacitance of the touch electrode 2.

The processing module further comprises a processor. The processor is connected to each AFE 122, and is configured to determine whether the corresponding second touch electrode is broken circuit according to the capacitance detected by each AFE 122. Moreover, in order to control the open and close of the first switch and the second switch, control circuits are also connected to the first switch and the second switch. The control circuits of the first switch and the second switch are connected to the processor, such that the first switch and the second switch are opened or closed under the control of the processor. A manner of controlling, by the processor, the first switch and the second switch and a manner of determining whether the second touch electrode is broken circuit are described below.

Optionally, the detection device may be integrated in a touch IC (Integrated Circuit) of the touch panel. When the touch panel operates normally, all the second switches 121 are closed, and all the first switches 112 are open. Therefore, each touch electrode 2 is connected to the corresponding AFE 122, and the AFE 122 detects a capacitance of the corresponding touch electrode 2.

Figure 4:
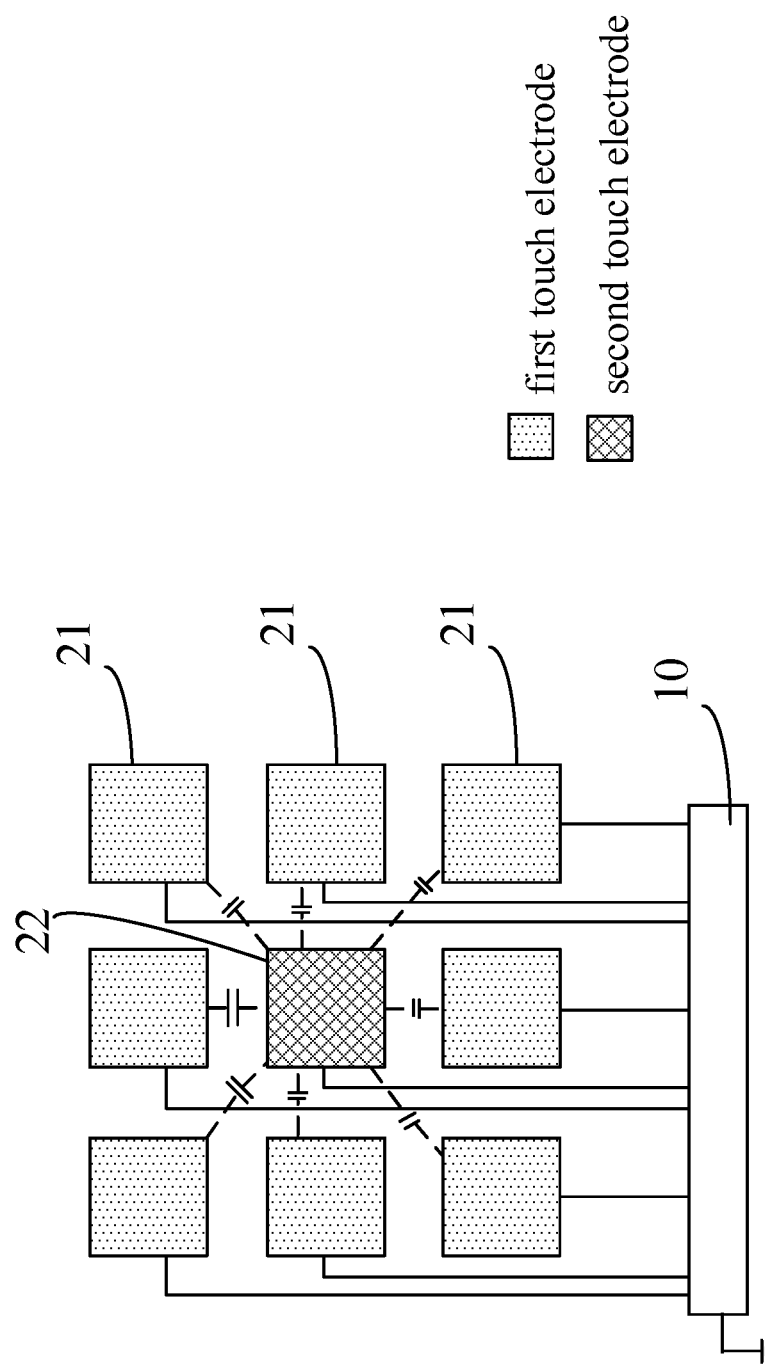
FIG. 4 is a schematic diagram of a detecting process of a touch panel according to an embodiment of the present disclosure.

FIG. 4 is a schematic diagram of a detection process of a touch panel provided by an embodiment of the present disclosure. The detection process is used to detect a touch electrode (e.g., the touch electrode 22 in FIG. 4) of the touch panel shown in FIG. 4. As shown in FIG. 4, eight touch electrodes (e.g., the touch electrodes 21 in FIG. 3) are arranged around the detected touch electrode 22 adjacently. The detected touch electrode is the second touch electrode 22, and all the touch electrodes adjacent to the second touch electrode 22 are the first touch electrodes 21. During the detection process shown in FIG. 3, the leads of the eight first touch electrodes 21 adjacent to the second touch electrode 22 are grounded through the wiring module 11. The processing module 12 is connected to the lead of the second touch electrode 22 to detect a capacitance value of the second touch electrode 22.

It should be noted that the first touch electrode and the second touch electrode are only used to differentiate the currently detected touch electrode and the touch electrodes adjacent to the currently detected touch electrode. During different detection processes, for example, in a first detection and a second detection, the first touch electrode in the second detection may be the second touch electrode in the first detection, and the second touch electrode in the second detection may also be the first touch electrode in the first detection.

The second touch electrode shown in FIG. 4 is adjacent to the eight first touch electrodes in total. However, for a second touch electrode at a different position on the touch panel, the number of the first touch electrodes adjacent thereto may also be different. For example, when the second touch electrode is at an edge of the touch panel, there are only five first touch electrodes adjacent thereto. For example, when the second touch electrode is at a corner of the touch panel, there are only three first touch electrodes adjacent thereto.

In addition, when the second touch electrode 22 is detected, it is also possible to ground only the portion of the first touch electrodes 21 which is adjacent to the second touch electrode 22. By taking the detection process shown in FIG. 4 as an example, it is also possible to ground only one to seven first touch electrodes 21, for example, one, two or four touch electrodes, of the eight first touch electrodes 21 shown in FIG. 4.

During the detection, by grounding the at least one first of touch electrodes adjacent to the second touch electrode, the second touch electrode and the first touch electrode with grounded lead form a capacitor (a capacitor shown in FIG. 4 is only schematic, and does not mean that a capacitor is actually connected between the first touch electrode and the second touch electrode). If the lead of the second touch electrode (that is, the currently detected touch electrode) is intact, i.e., not broken, a detected capacitance value of the second touch electrode after the first touch electrode grounded is greater than a detected capacitance value of the second touch electrode when the first touch electrode is not grounded. If the lead of the second touch electrode is broken, the detected capacitance value of the second touch electrode after the first touch electrode grounded is substantially unchanged compared to the detected capacitance value of the second touch electrode when the first touch electrode is not grounded. It can be seen that grounding the first touch electrode makes the difference between the capacitances of the touch control electrode with an intact lead and the touch electrode with a broken lead more obvious, which is more beneficial to detect whether the touch electrode is broken circuit more accurately.

Figure 5:
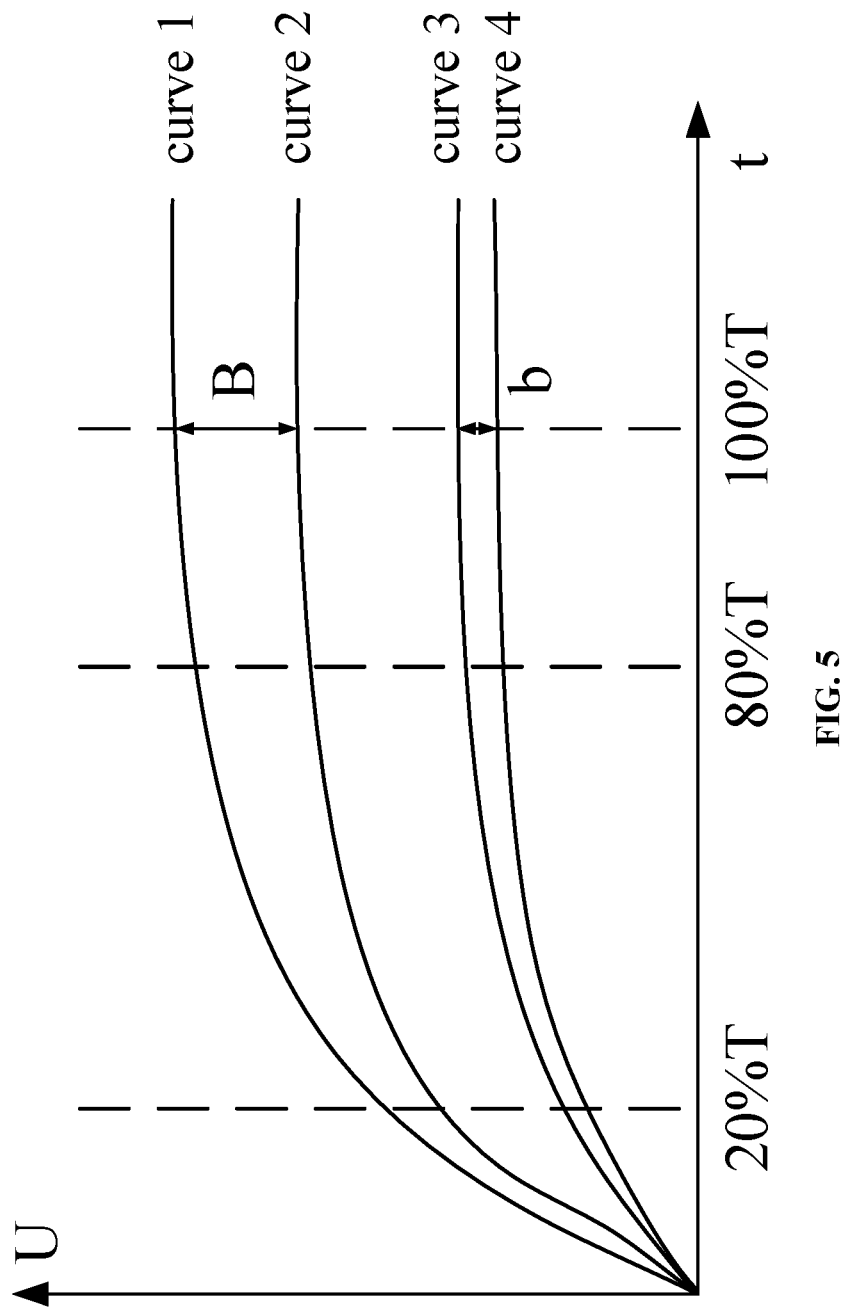
FIG. 5 is charging process curve of a touch panel according to an embodiment of the present disclosure.

FIG. 5 illustrates curves of a charging process of a touch electrode provided by an embodiment of the present disclosure. The curves 1 and 2 in FIG. 5 are charging curves of the touch electrode whose lead is not broken. Herein, the curve 1 is a charging curve of the second touch electrode when the first touch electrode is grounded, and the curve 2 is a charging curve of the second touch electrode when the first touch electrode is not grounded. The curves 3 and 4 in FIG. 5 are charging curves of the second touch electrode with a broken lead. Herein, the curve 3 is a charging curve of the second touch electrode when the first touch electrode is grounded, and the curve 4 is a charging curve of the second touch electrode when the first touch electrode is not grounded. As shown in FIG. 5, during the charging process of the touch electrode, as a charging time t increases, a voltage value U of the detected voltage signal generated by the touch electrode becomes larger. When the charging time reaches a certain level (100% T as shown in FIG. 5), the voltage signal remains substantially unchanged, and the charging process ends. As can be seen from a comparison of the curve 1 and the curve 3 or a comparison of the curve 2 and the curve 4, with the same charging time, a voltage of a voltage signal generated by the touch electrode with an intact lead is higher than a voltage of a voltage signal generated by the touch electrode with a broken lead. Herein, T represents a charging completion time of the touch electrode, which may be measured experimentally or may be set empirically.

The processing module 12 may be configured to send a pulse signal to the second touch electrode 22 through a lead connected to the second touch electrode 22, and determine a capacitance value of the second touch electrode 22 according to a voltage signal generated by the second touch electrode 22. The processing module 12 may charge the second touch electrode 22 by sending a pulse signal through the lead. Then, the capacitance value of the second touch electrode 22 may be obtained according to the detected voltage signal generated by the second touch electrode 22.

The processing module 12 may be configured to determine that the second touch electrode 22 is broken circuit when the capacitance change value of the second touch electrode 22 before and after the lead of the first touch electrode 21 grounded is less than a first set value. As can be seen from a comparison of the curve 1 and the curve 2, after the first touch electrode 21 is grounded, a voltage of a voltage signal generated on the second touch electrode 22 with an intact lead will rise greatly (as shown by a segment B of FIG. 4). However, as can be seen from a comparison of the curve 3 and the curve 4, after the first touch electrode 21 is grounded, a voltage of a voltage signal generated on the second touch electrode 22 with a broken lead will rise less (as shown by a segment b in FIG. 4). Therefore, it can be determined that whether the lead of the second touch electrode 22 is broken according to the change amplitude of the capacitance value of the second touch electrode 22 after the first touch electrode 21 grounded. In the present embodiment, the first set value may be set by test detection. For example, a plurality of touch electrodes whose leads are known unbroken are detected to acquire the capacitance change values of these touch electrodes before and after other touch electrodes adjacent to these touch electrodes are grounded, the minimum capacitance change value therein is taken as the first set value, or a value that is 10% to 20% less than the minimum capacitance change value is taken as the first set value.

It should be noted that, when there are a plurality of second touch electrodes, the capacitance change value of the second touch electrode 22 before and after the lead of the first touch electrode 21 grounded refers to a capacitance change value of the second touch electrode 22 being detected before and after grounding the lead of the first touch electrode 21 adjacent to the second touch electrode 22 currently being detected.

In another embodiment of the present disclosure, the processing module 12 may also be configured to determine that the second touch electrode 22 is broken circuit when a capacitance value of the second touch electrode 22 after the lead of the first touch electrode 21 grounded is less than a second set value. As can be seen from a comparison of the curve 1 and the curve 3 or a comparison of the curve 2 and the curve 4, with the same charging time a voltage of a voltage signal generated by the touch electrode with an intact lead is greater than a voltage of a voltage signal generated by the touch electrode with a broken lead. In addition, after the first touch electrode is grounded, the voltage of the signal generated on the touch electrode with the intact lead is much more greater. Therefore, whether the lead of the second touch electrode 22 is broken may be determined according to the magnitude of the capacitance value of the second touch electrode 22 detected after the first touch electrode 21 is grounded. The second set value may also be set by test detection. For example, a plurality of touch electrodes whose leads are known broken are detected (other touch electrodes adjacent to the touch electrode with the broken lead may be grounded or ungrounded) to acquire voltage values of voltage signals generated on these touch electrodes, the maximum value therein is taken as the second set value, or a value that is 10% to 20% greater than the maximum value is taken as the second set value.

It should be noted that, when there are a plurality of second touch electrodes, the capacitance value of the second touch electrode 22 after the lead of the first touch electrode 21 is grounded refers to a capacitance value of the second touch electrode 22 being detected after the lead of the first touch electrode 21 adjacent to the second touch electrode 22 currently being detected is grounded.

In the process of acquiring the first set value and the second set value, the determination of the touch electrode whose lead is known unbroken and the touch electrode whose lead is known broken may be performed by using the existing detection method, e.g., may be detected by a microscope.

As easily known from FIG. 5, during the detection process, when the charging time reaches 100% T, the difference between the voltage values of the voltage signal generated by the second touch electrode with the intact lead and the voltage signal generated by the second touch electrode with the broken lead is maximum. Therefore, the detection may be performed when the charging time reaches 100% T, which is beneficial for accurately detecting whether the lead of the second touch electrode is broken.

Figure 6:
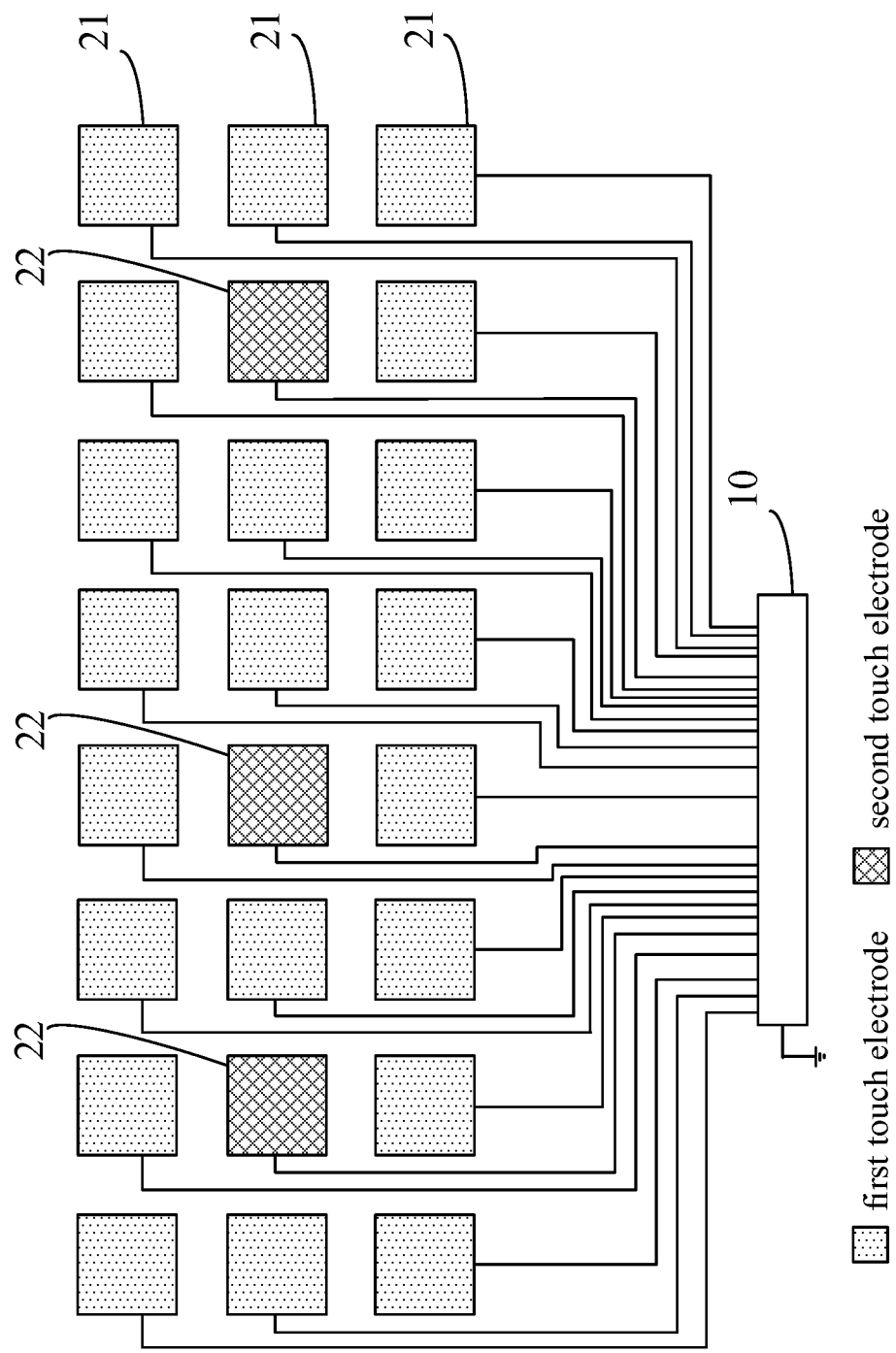
FIG. 6 a schematic diagram of distribution of first touch electrodes and second touch electrodes according to an embodiment of the present disclosure.

FIG. 6 is a schematic distribution diagram of first touch electrodes and second touch electrodes according to an embodiment of the present disclosure. As shown in FIG. 6, a plurality of second touch electrodes 22 is connected to the detection device 10 respectively, such that the processing module of the detection device 10 determines whether the leads of the second touch electrodes 22 are broken by detecting capacitance values of these second touch electrodes 22 respectively. In the case of the distribution shown in FIG. 6, all the first touch electrodes 21 may be grounded after once grounding operation and then the plurality of second touch electrodes 22 is detected, thereby improve the detection efficiency.

As shown in FIG. 6, any two of the second touch electrodes 22 are spaced by at least one of the first touch electrodes 21. Since one of the first touch electrode 21 is arranged between the adjacent second touch electrodes 22, a plurality of first touch electrodes 21 around each second touch electrode 22 may be grounded, which is beneficial for increasing a total capacitance formed between the first touch electrodes 21 and the second touch electrodes 22, thereby improving the detection accuracy.

In some embodiments, each touch electrodes adjacent to the second touch electrode 22 is the first touch electrode 21. Therefore, during the detection, each of the first touch electrodes 21 adjacent to the second touch electrode 22 may be grounded, such that the capacitance formed between the first touch electrode 21 and the second touch electrode 22 may be maximized, which is beneficial for improving the detection accuracy. And during the detecting process, it is impossible to determine whether the lead of the first touch electrode 21 adjacent to the second touch electrode 22 is intact. If the lead of the adjacent first touch electrode 21 is broken, the detected capacitance value of the second touch electrode 22 may not increase even if the lead of the first touch electrode 21 is grounded. Therefore, the first touch electrodes 21 adjacent to the second touch electrode 22 are all grounded. Even if the leads of a portion of the first touch electrodes 21 are broken, the capacitance value of the detected second touch electrode 22 may increase as long as the lead of at least one of first touch electrodes 21 is intact. However, the probability that all the leads of the first touch electrodes 21 are broken is much smaller than the probability that the lead of one first touch electrode 21 is broken.

Figure 7:
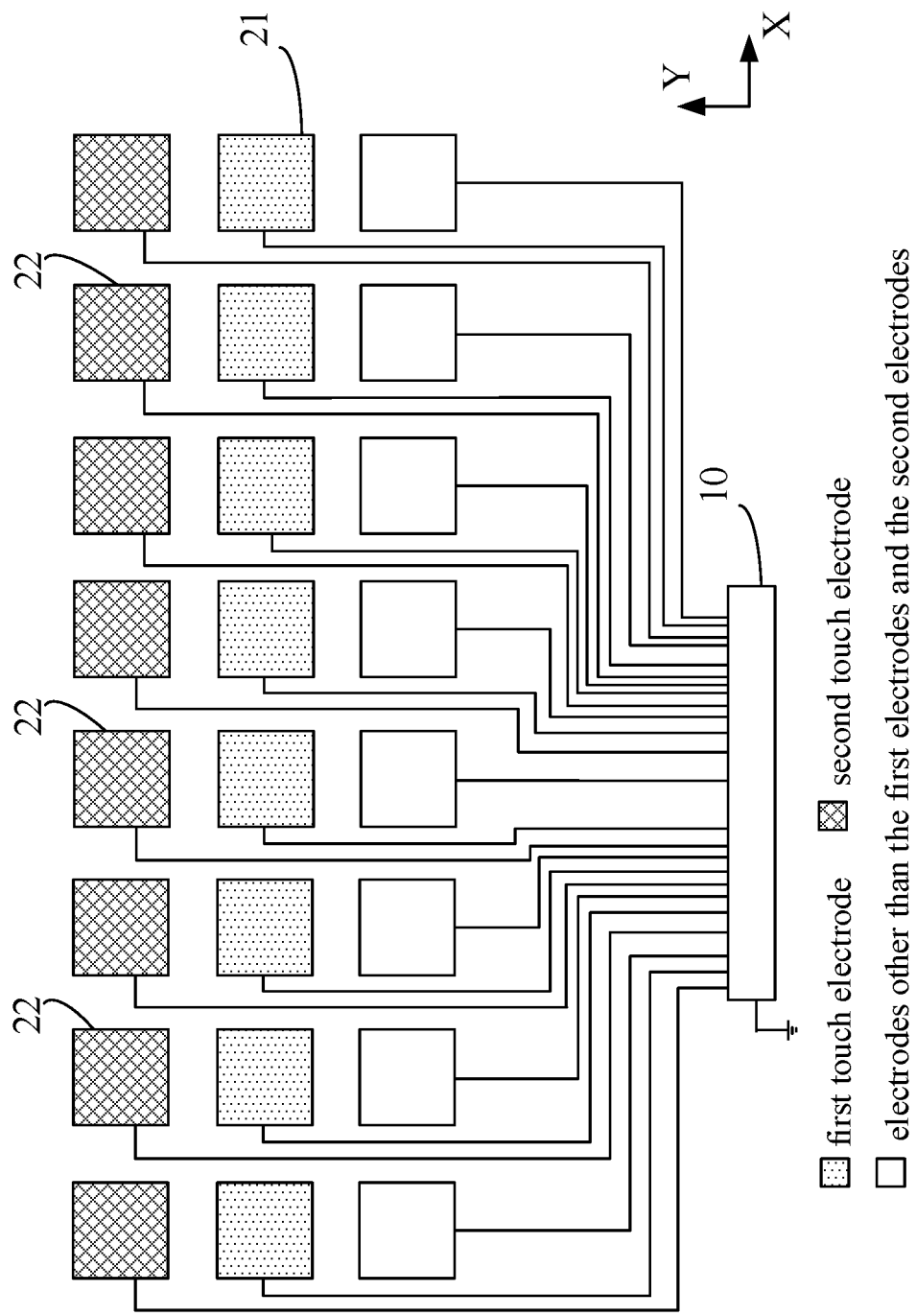
FIG. 7 a schematic diagram of distribution of first touch electrodes and second touch electrodes according to an embodiment of the present disclosure.

FIG. 7 is another schematic distribution diagram of first touch electrodes and second touch electrodes provided by an embodiment of the present disclosure. As shown in FIG. 7, a set of second touch electrodes 22 is located at an edge of the touch panel, and is adjacent to only one set of first touch electrodes 21. This set of first touch electrodes 21 and this set of second touch electrodes 22 are arranged in a target direction. In the present embodiment, the target direction is a row direction, e.g., an X direction in FIG. 7.

The processing module of the detection device 10 may be configured to detect capacitance values of a set of second touch electrodes 22 in the target direction one by one. The set of second touch electrodes 22 in the target direction is adjacent to a set of first touch electrodes 21 in the target direction.

In the case of the distribution shown in FIG. 7, to improve the detection efficiency, a row of first touch electrodes 21 adjacent to this row of second touch electrodes 22 may be grounded after once grounding operation, and then a row of second touch electrodes 22 is detected.

It should be noted that when the second touch electrodes 22 are not located at an edge of the touch panel, one set of second touch electrodes 22 is adjacent to two sets of first touch electrodes 21. In this case, the two sets of first touch electrodes 21 adjacent to this set of second touch electrodes 22 may be all grounded to increase the capacitance formed between the first touch electrodes 21 and the second touch electrodes 22, thereby improving the detection accuracy. Of course, one of the two sets of first touch electrodes 21 adjacent to this set of second touch electrodes 22 may be grounded.

In other embodiments, the target direction may also be a column direction, e.g., a Y direction in FIG. 6. In this case, a set of second touch electrodes include a column of second touch electrodes arranged in the column direction, and a set of first touch electrodes includes a column of first touch electrodes arranged in the column direction, such that a column of second touch electrodes is detected.

Figure 8:
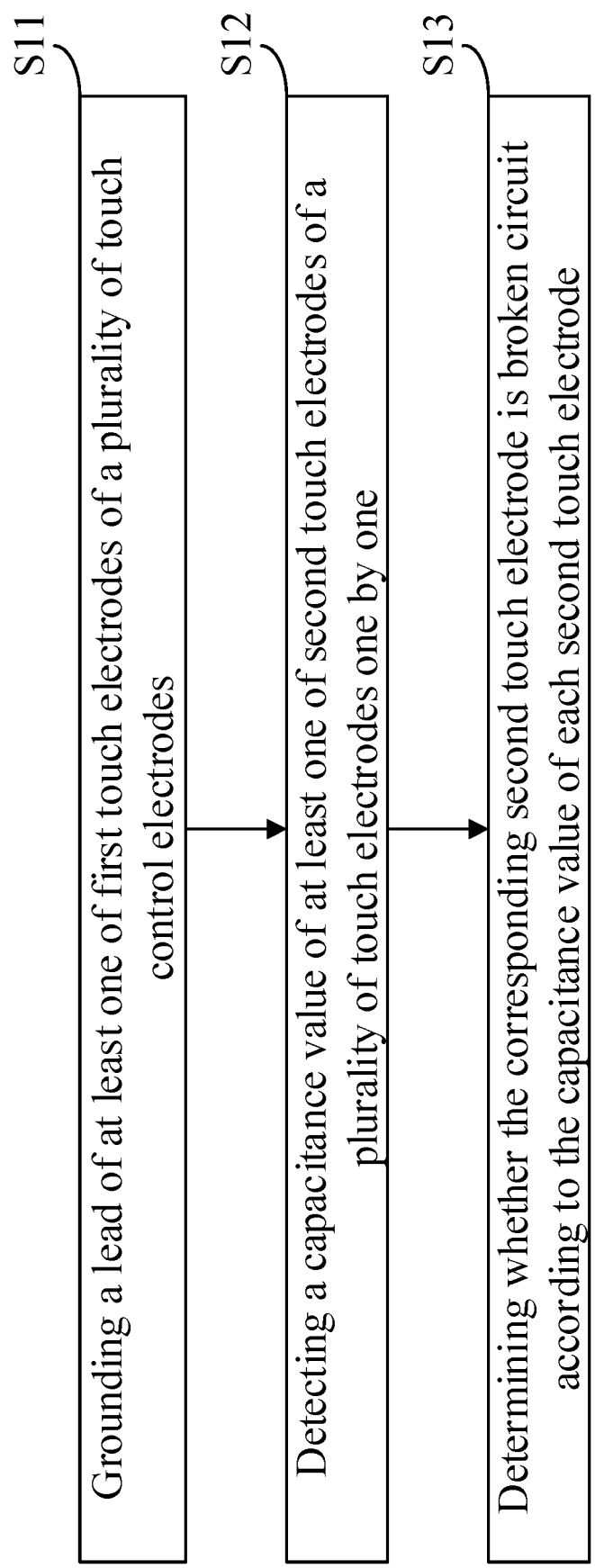
FIG. 8 is a flowchart of a detection method for a touch panel according to an embodiment of the present disclosure.

FIG. 8 is a flowchart of a detection method for a touch panel provided by an embodiment of the present disclosure. The detection method is used to detect the touch panel shown in FIG. 1 by using the detection device shown in FIG. 2. As shown in FIG. 8, the detection method comprises the following steps.

In step S11, a lead of at least one of first touch electrodes of a plurality of touch control electrodes is grounded.

The touch electrode being detected is a second touch electrode. All the touch electrodes adjacent to the second touch electrode are the first touch electrode. Each second touch electrode is adjacent to at least one of first touch electrodes.

The step S11 may be performed by the foregoing wiring module.

Referring to FIG. 4, during the detection process, leads of the eight first touch electrodes 21 adjacent to the second touch electrode 22 are all grounded. In other embodiments, only a portion of the first touch electrodes 21 adjacent to the second touch electrode 22 may be grounded. By taking the detection process shown in FIG. 4 as an example, only one, two or four of the eight first touch electrodes 21 shown in FIG. 4 may be grounded.

Furthermore, the leads of the first touch electrodes may be grounded according to a manner shown in FIG. 6 or FIG. 7.

In step S12, a capacitance value of at least one of second touch electrodes of a plurality of touch electrodes is detected one by one.

The step S12 may be performed by the foregoing processing module.

In the present embodiment, the processing module may send a pulse signal to the second touch electrode through a lead connected to the second touch electrode, and determine the capacitance value of the second touch electrode according to a voltage signal generated by the second touch electrode. By sending the pulse signal through the lead from the processing module, the second touch electrode is charged. Then the capacitance value of the second touch electrode is obtained according to the detected voltage signal generated by the second touch electrode.

When only one second touch electrode is detected, the lead of the first touch electrode may be grounded according to a manner shown in FIG. 4. That is, in each detection, a grounding operation is performed once to ground the first touch electrodes adjacent to the detected second touch electrode.

In addition, after the grounding operation is performed once, a plurality of second touch electrodes may be detected to improve the detection efficiency. When the plurality of second touch electrodes is detected, the lead of the first touch electrode may be grounded according to a manner shown in FIG. 6.

Optionally, as shown in FIG. 6, any two of the second touch electrodes 22 are spaced by at least one of the first touch electrodes 21. Since one first touch electrode 21 is arranged between the adjacent second touch electrodes 22, a plurality of first touch electrodes 21 which are arranged around each second touch electrode 22 may be grounded, which is beneficial for increasing the total capacitance formed between the first touch electrodes 21 and the second touch electrodes 22, thereby improving the detection accuracy.

Each touch electrodes adjacent to each second touch electrode 22 is the first touch electrode 21. Therefore, during the detection, the first touch electrodes 21 adjacent to each second touch electrode 22 may be all grounded, such that the capacitance formed between the first touch electrode 21 and the second touch electrode 22 may be maximized, which is beneficial for improving the detection accuracy. And during the detecting process, since it is impossible to determine whether the lead of the first touch electrode 21 adjacent to the second touch electrode 22 is intact, if the lead of the adjacent first touch electrode 21 is broken, the detected capacitance value of the second touch electrode 22 may not increase even if the lead of the first touch electrode 21 is grounded. Therefore, the first touch electrodes 21 adjacent to the second touch electrode 22 are all grounded. Even if the leads of a portion of the first touch electrodes 21 are broken, the capacitance value of the detected second touch electrode 22 may increase as long as the lead of at least one of first touch electrodes 21 is intact. However, the probability that the leads of the first touch electrodes 21 are all broken is much smaller than the probability that the lead of one first touch electrode 21 is broken.

In addition, the lead of the first touch electrode 21 may be grounded according to a manner shown in FIG. 7. In this way, a row of second touch electrodes 22 may be detected after once grounding operation to improve the detection efficiency.

When the step S11 is performed, at least one set of first touch electrodes arranged in the target direction may be grounded. Correspondingly, when the step S12 is performed, the capacitance values of a set of second touch electrodes 22 arranged in the target direction may be detected one by one.

Herein, a set of second touch electrodes 22 in the target direction is adjacent to at least one set of first touch electrodes 21 in the target direction. In the present embodiment, the target direction may be a row direction, e.g., the X direction in FIG. 7. A set of second touch electrodes includes a row of second touch electrodes arranged in the row direction, and a set of first touch electrodes includes a row of first touch electrodes arranged in the row direction.

As shown in FIG. 7, a set of second touch electrodes 22 is located at an edge of the touch panel, and is adjacent to only one set of first touch electrodes 21. When a set of second touch electrodes 22 is not located at an edge of the touch panel, a set of second touch electrodes 22 is adjacent to two sets of first touch electrodes 21. At this time, the two sets of first touch electrodes 21 adjacent to this set of second touch electrodes 22 may be all grounded to increase the capacitance formed between the first touch electrodes 21 and the second touch electrodes 22, thereby improving the detection accuracy.

In other embodiments, the target direction may also be a column direction, e.g., the Y direction in FIG. 6. In this case, a set of second touch electrodes includes a column of second touch electrodes arranged in the column direction, and a set of first touch electrodes includes a column of first touch electrodes arranged in the column direction, such that a column of second touch electrodes is detected.

In step S13, whether the corresponding second touch electrode is broken circuit is determined according to the capacitance value of each second touch electrode.

The step S13 may be performed by the foregoing processing module.

When the capacitance change value of the second touch electrode 22 before and after the lead of the first touch electrode 21 is grounded is less than a first set value, it is determined that the second touch electrode 22 is broken circuit. After the first touch electrode 21 is grounded, the increasing amplitude of a voltage of a voltage signal generated on the second touch electrode 22 with a broken lead is less. Therefore, whether the lead of the second touch electrode 22 is broken may be determined according to the change amplitude of the capacitance value of the second touch electrode 22 after the first touch electrode 21 is grounded.

In another embodiment of the present disclosure, when the capacitance value of the second touch electrode 22 after the lead of the first touch electrode 21 is grounded is less than the second set value, it may be determined that the second touch electrode 22 is broken circuit. As the charging time is same, a voltage of a voltage signal generated by the touch electrode with an intact lead is higher than a voltage of a voltage signal generated by the touch electrode with a broken lead, and the voltage of the voltage signal generated on the touched electrode with the intact lead will be higher after the first touch electrode 21 is grounded. Therefore, whether the lead of the second touch electrode 22 is broken may be determined according to the magnitude of the detected capacitance value of the second touch electrode 22 after the first touch electrode 21 is grounded.

Both the first set value and the second set value may be set by test detection. The setting method may refer to the foregoing device embodiment.

During the detection, by grounding the at least one of first touch electrodes adjacent to the second touch electrode, the second touch electrode and the first touch electrode with grounded lead form a capacitor. If the lead of the second touch electrode (that is, the currently detected touch electrode) is intact, i.e., not broken, a capacitance value of the second touch electrode detected after the first touch electrode grounded is greater than a capacitance value of the second touch electrode detected when the first touch electrode is not grounded. If the lead of the second touch electrode is broken, a capacitance value of the second touch electrode detected after the first touch electrode grounded is substantially unchanged compared to a capacitance value of the second touch electrode detected when the first touch electrode is not grounded, such that the difference between the capacitances of the touch control electrode with an intact lead and the touch electrode with a broken lead is more obvious, which is more beneficial for detecting whether the touch electrode is broken circuit more accurately.

The foregoing descriptions are only exemplary embodiments of the present disclosure, and are not intended to limit the present disclosure. Within the spirit and principles of the disclosure, any modifications, equivalent substitutions, improvements, etc., are within the protection scope of appended claims of the present disclosure.

What is claimed is:

1. A detection device for a touch panel, wherein the touch panel comprises a plurality of touch electrodes arranged in a matrix, and the detection device comprises:
    a wiring module configured to ground a lead of at least one of first touch electrodes of the plurality of touch electrodes; and
    a processing module configured to detect a capacitance value of at least one of second touch electrodes of the plurality of touch electrodes one by one, and determine whether the corresponding second touch electrode is broken circuit according to the capacitance value of each of the second touch electrodes, each of the second touch electrodes being adjacent to at least one of the first touch electrodes; and
    wherein the processing module is configured to determine that the second touch electrode is broken circuit when a capacitance change value of the second touch electrode before and after the lead of the first touch electrode is grounded is less than a first set value; and
    wherein each touch electrode adjacent to the second touch electrode is the first touch electrode.

2. The detection device according to claim 1, wherein any two of the second touch electrodes are spaced by at least one of the first touch electrodes.

3. The detection device according to claim 1, wherein a portion of the touch electrodes adjacent to the second touch electrode are the first touch electrodes.

4. The detection device according to claim 1, wherein the processing module is configured to detect capacitance values of a set of second touch electrodes in a target direction one by one, the target direction is one of a row direction and a column direction, and the set of second touch electrodes in the target direction is adjacent to at least one set of first touch electrodes in the target direction.

5. The detection device according to claim 1, wherein the processing module is configured to determine that the second touch electrode is broken circuit when a capacitance value of the second touch electrode after the lead of the first touch electrode is grounded is less than a second set value.

6. The detection device according to claim 1, wherein the processing module is configured to send a pulse signal to the second touch electrode through a lead connected to the second touch electrode, and determine the capacitance value of the second touch electrode according to a voltage signal generated by the second touch electrode.

7. The detection device according to claim 2, wherein the processing module is configured to determine that the second touch electrode is broken circuit when a capacitance change value of the second touch electrode before and after the lead of the first touch electrode is grounded is less than the first set value.

8. The detection device according to claim 2, wherein the processing module is configured to determine that the second touch electrode is broken circuit when the capacitance value of the second touch electrode after the lead of the first touch electrode is grounded is less than a second set value.

9. The detection device according to claim 1, wherein the wiring module comprises a ground line and a plurality of first switches, and the lead of each of the touch electrodes is connected to the ground line through one of the plurality of first switches;
    the processing module comprises a plurality of second switches, a plurality of analog front ends, and a processor, the lead of each of the touch electrodes is connected to one of the plurality of analog front ends through one of the plurality of second switches, and each of the analog front ends is connected to the processor; and
    the one of the plurality of first switches and the one of the plurality of second switches are connected to a same touch electrode.

10. A detection method for a touch panel, wherein the touch panel comprises a plurality of touch electrodes arranged in a matrix, and the detection method comprises:
    grounding a lead of at least one of first touch electrodes of the plurality of touch electrodes by a wiring module; and
    detecting a capacitance value of at least one of second touch electrodes of the plurality of touch electrodes one by one by a processing module; and
    determining whether the corresponding second touch electrode is broken circuit according to the capacitance value of each of the second touch electrodes, each of the second touch electrodes being adjacent to at least one of the first touch electrodes;

wherein determining whether the corresponding second touch electrode is broken circuit according to the capacitance value of each of the second touch electrodes comprises:

determining that the second touch electrode is broken circuit when a capacitance change value of the second touch electrode before and after the lead of the first touch electrode is grounded is less than a first set value; and wherein each touch electrode adjacent to the second touch electrode is the first touch electrode.

11. The detection method according to claim 10, wherein any two of the second touch electrodes are spaced by at least one first touch electrode.

12. The detection method according to claim 10, wherein grounding a lead of at least one of first touch electrodes of the plurality of touch electrodes comprises:

grounding at least one set of the first touch electrodes in a target direction; and detecting a capacitance value of at least one of second touch electrodes of the plurality of touch electrodes one by one comprises:

detecting capacitance values of a set of second touch electrodes in a target direction one by one;

wherein the target direction is one of a row direction and a column direction, and the set of second touch electrodes in the target direction is adjacent to at least one set of first touch electrodes in the target direction.

13. The detection method according to claim 10, wherein determining whether the corresponding second touch electrode is broken circuit according to the capacitance value of each of the second touch electrodes comprises:

determining that the second touch electrode is broken circuit when a capacitance value of the second touch electrode after the lead of the first touch electrode is grounded is less than a second set value.

14. The detection method according to claim 10, wherein detecting a capacitance value of at least one of second touch electrodes of the plurality of touch electrodes one by one comprises:

sending a pulse signal to the second touch electrode through a lead connected to the second touch electrode, and determining the capacitance value of the second touch electrode according to a voltage signal generated by the second touch electrode.

15. The detection method according to claim 10, wherein the wiring module comprises a ground line and a plurality of first switches, and the lead of each of the touch electrodes is connected to the ground line through one of the plurality of first switches;

the processing module comprises a plurality of second switches, a plurality of analog front ends, and a processor, the lead of each of the touch electrodes is connected to one of the plurality of analog front ends through one of the plurality of second switches, and each of the analog front ends is connected to the processor; and the one of the plurality of first switches and the one of the plurality of second switches are connected to a same touch electrode.

16. A detection device for a touch panel, wherein the touch panel comprises a plurality of touch electrodes arranged in a matrix, and the detection device comprises:

a wiring module configured to ground a lead of at least one of first touch electrodes of the plurality of touch electrodes; and a processing module configured to detect a capacitance value of at least one of second touch electrodes of the plurality of touch electrodes one by one, and determine whether the corresponding second touch electrode is broken circuit according to the capacitance value of each of the second touch electrodes, each of the second touch electrodes being adjacent to at least one of the first touch electrodes; and wherein the processing module is configured to determine that the second touch electrode is broken circuit when a capacitance change value of the second touch electrode before and after the lead of the first touch electrode is grounded is less than a first set value;

wherein each touch electrode adjacent to the second touch electrode is the first touch electrode;

the wiring module comprises a ground line and a plurality of first switches, and the lead of each of the touch electrodes is connected to the ground line through one of the plurality of first switches;

the processing module comprises a plurality of second switches, a plurality of analog front ends, and a processor, the lead of each of the touch electrodes is connected to one of the plurality of analog front ends through one of the plurality of second switches, and each of the analog front ends is connected to the processor; and the one of the plurality of first switches and the one of the plurality of second switches are connected to a same touch electrode.

* * * * *